US000001821H

United States Statutory Invention Registration [19]

[11] Reg. Number: H1,821

Kosinski

[45] Published: Dec. 7, 1999

[54] METHOD AND APPARATUS FOR OPERATING A DRIVER AND AN ASSOCIATED NUMBER OF WORK TOOLS

[75] Inventor: Brian J. Kosinski, Yorkville, Ill.

[73] Assignee: Caterpillar, Incorporated, Peoria, Ill.

[21] Appl. No.: 08/887,036

[22] Filed: Jul. 2, 1997

[51] Int. Cl.[6] ..... B23Q 5/00

[52] U.S. Cl. ..... 173/180; 173/4; 173/20; 173/176

[58] Field of Search ..... 173/2, 4, 20, 171, 173/176, 180

[56] References Cited

U.S. PATENT DOCUMENTS

| | | | |
|---|---|---|---|
| 2,924,134 | 2/1960 | Harmes . | |
| 3,835,934 | 9/1974 | Schoeps et al. | 173/12 |
| 4,613,800 | 9/1986 | Jeppsson | 318/434 |
| 4,620,362 | 11/1986 | Reynolds | 29/586 |
| 4,685,050 | 8/1987 | Polzer et al. . | |
| 5,014,794 | 5/1991 | Hansson | 173/12 |
| 5,115,701 | 5/1992 | Lehnert . | |
| 5,181,575 | 1/1993 | Maruyama et al. . | |
| 5,361,852 | 11/1994 | Inoue et al. . | |
| 5,366,026 | 11/1994 | Maruyama et al. . | |
| 5,493,139 | 2/1996 | Akiyama et al. | 257/316 |

*Primary Examiner*—Harold J. Tudor
*Attorney, Agent, or Firm*—Maginot, Addison & Moore

[57] ABSTRACT

A method of operating a driver and an associated number of work tools includes the step of securing a first work tool to the driver. The first work tool has a first identification device attached thereto. The method also includes the step of determining a first identification value associated with the first identification device and generating a first identification signal in response thereto. The method further includes the step of operating the driver so as to produce a first mechanical output based on the first identification signal. Moreover, the method includes the step of removing the first work tool from the driver and securing a second work tool to the driver. The second work tool has a second identification device attached thereto. The method also includes the step of determining a second identification value associated with the second identification device and generating a second identification signal in response thereto. The method yet further includes the step of operating the driver so as to produce a second mechanical output of the driver based on the second identification signal. The first mechanical output is different from the second mechanical output. A driver assembly is also disclosed.

25 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR OPERATING A DRIVER AND AN ASSOCIATED NUMBER OF WORK TOOLS

TECHNICAL FIELD OF THE INVENTION

The present invention relates generally to a powered driver, and more particularly to a method and apparatus for operating a driver and an associated number of work tools.

BACKGROUND OF THE INVENTION

The assembly of a construction machine, such as a wheel loader, typically requires that the various components thereof be attached utilizing threaded fasteners, such as bolts, screwed into internally threaded bores defined in the components being attached. In order for the construction machine to be assembled properly, different types (i.e. sizes and shapes) of bolts are used in the appropriate places. Moreover, bolts of a first type may be required to be tightened to a first torque value, while bolts of a second type may be required to be tightened to a second torque value which is different from the first torque value. For example, the torque value required to tighten a ⅜–16 (inch) bolt is different than the torque value required to tighten a ½–13 (inch) bolt.

Often, the bolts of a construction machine are tightened utilizing a driver and a work tool coupled thereto (e.g. a pneumatic driver and a socket, respectively) which are dedicated to tightening a certain type of bolt to a single, predetermined torque value. However, since the types of the bolts utilized to assemble the construction machine vary, and each type of bolt is required to be tightened to a different, predetermined torque value, several dedicated drivers and sockets must be provided to tighten all the bolts used to assemble the construction machine. Having several dedicated drivers and sockets is expensive, and thus adds to the manufacturing cost of the construction machine. In addition, if a socket corresponding to a first type of bolt which must be driven to a first predetermined torque value is secured to a driver which is associated with a second type of bolt, the bolt may potentially be tightened to an incorrect torque value.

What is needed therefore is a method and apparatus for operating a driver and an associated number of work tools which overcomes one or more of the above-mentioned drawbacks.

SUMMARY OF THE INVENTION

In accordance with a first embodiment of the present invention, there is provided a method of operating a driver and an associated work tool. The method includes the step of securing the work tool to the driver. The work tool has an identification device attached thereto. The method also includes the step of determining an identification value associated with the identification device and generating an identification signal in response thereto. The method further includes the step of operating the driver so as to produce mechanical output based on the identification signal.

In accordance with a second embodiment of the present invention, there is provided a method of operating a driver and an associated number of work tools. The method includes the step of securing a first work tool to the driver. The first work tool has a first identification device attached thereto. The method also includes the step of determining a first identification value associated with the first identification device and generating a first identification signal in response thereto. The method further includes the step of operating the driver so as to produce a first mechanical output based on the first identification signal. Moreover, the method includes the step of removing the first work tool from the driver and securing a second work tool to the driver. The second work tool has a second identification device attached thereto. The method also includes the step of determining a second identification value associated with the second identification device and generating a second identification signal in response thereto. The method yet further includes the step of operating the driver so as to produce a second mechanical output of the driver based on the second identification signal. The first mechanical output is different from the second mechanical output.

In accordance with a third embodiment of the present invention, there is provided a driver assembly. The assembly includes a driver having a processing unit. The assembly further includes a work tool having an identification device secured thereto. The work tool is securable to the driver The identification device is electrically coupled to the processing unit so as to enable the processing unit to determine an identification value associated with the identification device when the work tool is secured to the driver.

BEST MODE FOR CARRYING OUT THE INVENTION

Figure 1:
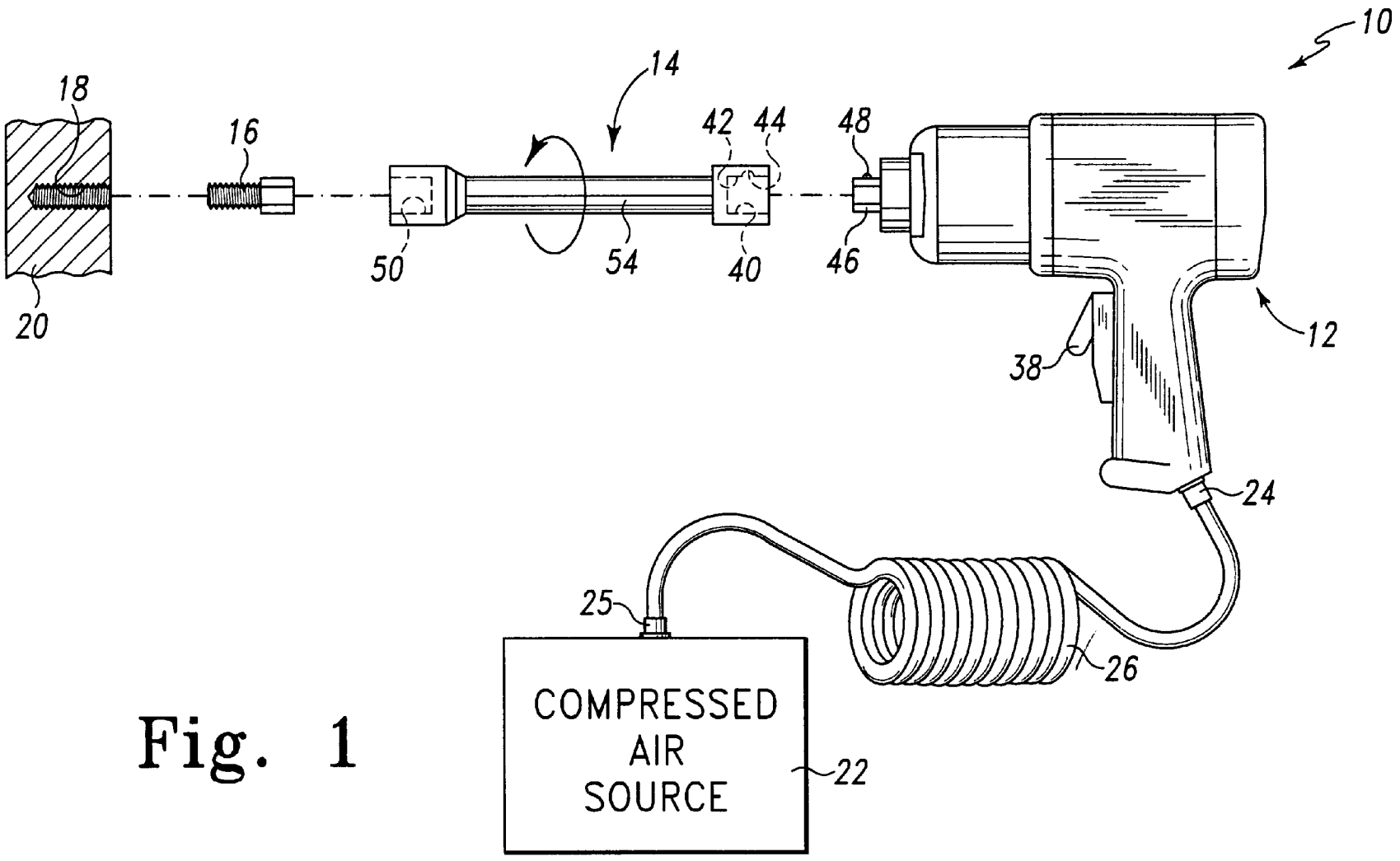
FIG. 1 is an exploded perspective view of a fastener tightening assembly which incorporates the features of the present invention therein, with the driver of the fastener tightening assembly being shown schematically coupled to an air source.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
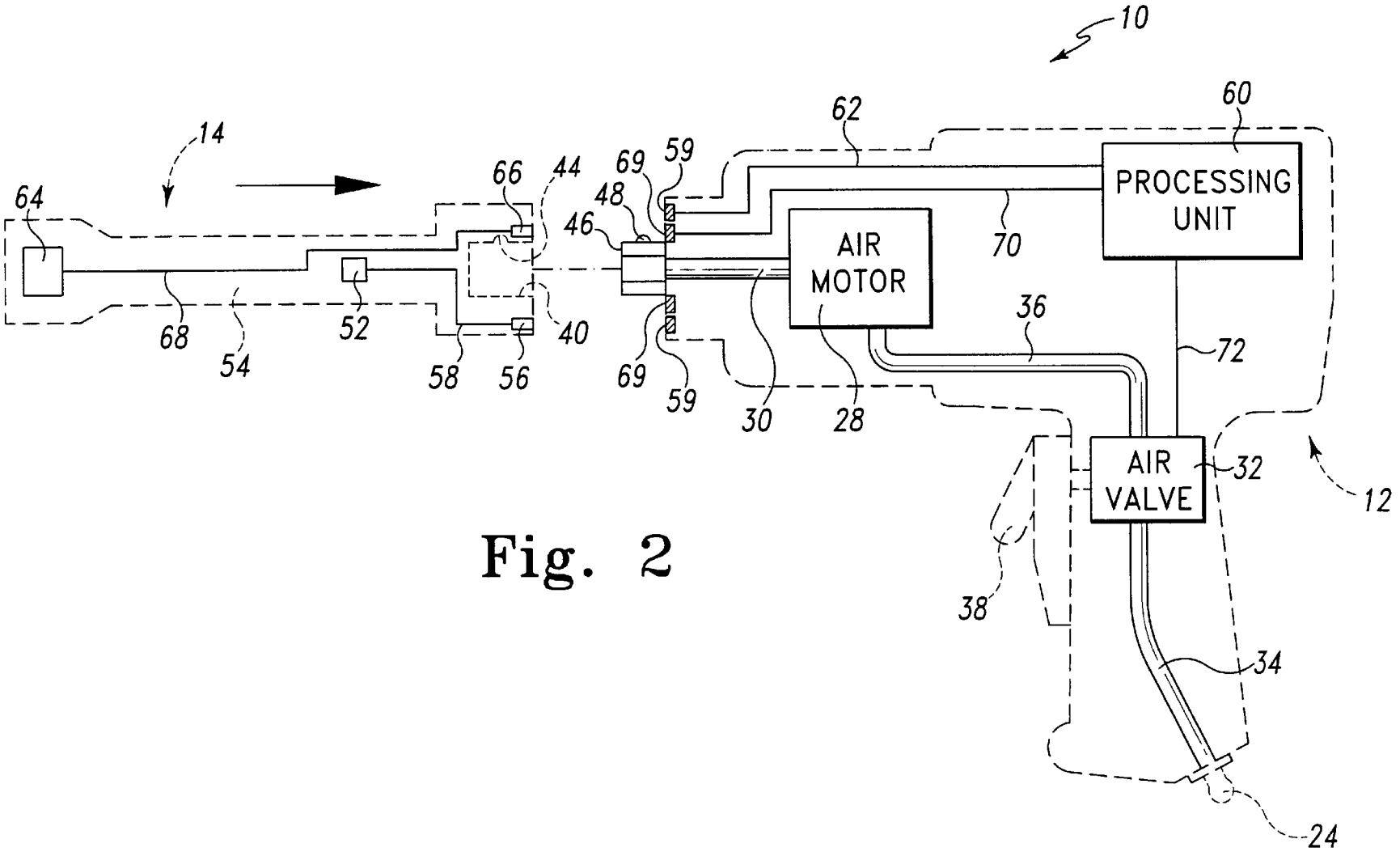
FIG. 2 is a schematic view of the driver and the socket of the fastener tightening assembly of FIG. 1 (note that the terminals 59, 69 are shown in cross section for clarity of description)

Referring now to FIGS. 1 and 2, there is shown a fastener tightening assembly 10 which incorporates the features of the present invention therein. The fastener tightening assembly 10 includes a pneumatic driver 12 and a work tool or socket 14. The driver 12 drives or otherwise rotates the socket 14 in order to tighten a fastener such as bolt 16 into a threaded bore 18 defined in a work piece 20.

The driver 12 is in fluid communication with a compressed air source 22. In particular, an inlet coupling 24 of the driver 12 is coupled to an outlet coupling 25 of the air source 22 via an air hose 26. The air source 22 provides the operative power necessary to drive the driver 12. In particular, the driver 12 includes an air motor 28 which is in fluid communication with the air source 22. The air motor 28 includes an output spindle 30. Air or operation pressure which is generated by the air source 22 is translated to rotational output of the spindle 30 by the air motor 28.

A proportional air control valve 32 is provided to control the flow of pressurized air to the air motor 28. More specifically, an inlet of the air control valve 32 is coupled to the inlet coupling 24 via an air line 34, whereas an outlet of the air control valve 32 is coupled to an inlet of the air motor 28 via an air line 36. The control valve is mechanically coupled to a trigger 38 of the driver 12. As a user squeezes the trigger 38, pressurized air from the air source 22 is provided to the air motor 28 thereby causing rotation of spindle 30. As the user squeezes the trigger 38 further, the magnitude of air pressure supplied to the air motor 28 increases thereby increasing rotational output of the spindle 30. Conversely, as the user releases the trigger 38, the control valve is positioned in a closed position which isolates the air motor 28 from the air source 22 thereby ceasing rotational output of the spindle 30.

The socket 14 is securable to the driver 12. In particular, the socket 14 has a recess 40 defined in a first end thereof. A side wall 42 of the recess 40 has a void 44 defined therein. The output spindle 30 has a coupling member 46 on a first end thereof which includes a spring loaded bearing or detent 48. The detent 48 is received into the void 44 thereby allowing the socket 14 to be non-rotatably secured to the coupling member 46 of the output spindle 30. Hence, rotation of the output spindle 30 causes rotation of the socket 14.

The socket 14 has a recess 50 defined in a second end thereof. The recess 50 is configured to receive a head of the bolt 16 therein. The recess 50 may be provided in one of a number of shapes and sizes in order to accommodate bolts 16 of various types. It should therefore be appreciated that a separate socket 14 is provided for each particular type of bolt 16.

The socket 14 includes a tool identification device 52. The tool identification device 52 is embedded in or otherwise attached to a body potion 54 of the socket 14. As will be discussed further below, the tool identification device 52 is provided to identify (1) the type (i.e. size and shape) of the particular socket 14 and (2) the torque requirements associated with the bolt 16 being driven thereby. The tool identification device 52 is electrically coupled to an electrical terminal 56 via a signal line 58. The driver 12 includes a ring-shaped electrical terminal 59 which is electrically coupled to a processing unit 60 via a signal line 62. When the socket 14 is secured to the coupling member 46 of the output spindle 30, the electrical terminal 56 makes sliding contact with the electrical terminal 59 during rotation of the socket 14 thereby electrically coupling the tool identification device 52 to the processing unit 60 via an electrical path which includes the signal line 58, the electrical terminal 56, the electrical terminal 59, and the signal line 62.

The socket 14 further includes a torque sensing device 64. The torque sensing device 64 is embedded in or otherwise attached to a body potion 54 of the socket 14. As will be discussed further below, the torque sensing device 64 is provided to sense or otherwise detect the torque generated by the air motor 28 and transmitted to the bolt 16 through the socket 14. The torque sensing device 64 may be any device which is capable of sensing such a torque and thereafter generating a torque signal indicative of the magnitude of the sensed torque. For example, the torque sensing device 64 may be a strain gage or similar device. The torque sensing device 64 is electrically coupled to an electrical terminal 66 via a signal line 68. The driver 12 includes a ring-shaped electrical terminal 69 which is electrically coupled to the processing unit 60 via a signal line 70. When the socket 14 is secured to the coupling member 46 of the output spindle 30, the electrical terminal 66 makes sliding contact with the electrical terminal 69 during rotation of the socket 14 thereby electrically coupling the torque sensing device 64 to the processing unit 60 via an electrical path which includes the signal line 68, the electrical terminal 66, the electrical terminal 69, and the signal line 70.

The processing unit 60 may be any known processing unit which is capable of receiving data from the torque identification device 64 and the tool sensing device 52 and storing such data in a memory device 74 associated therewith for subsequent processing thereof. Moreover, the processing unit 60 may include an analog interface circuit (not shown) which converts the output signals from the torque sensing device 64 into a signal which is suitable for presentation to an input of a microprocessor (not shown) of the processing unit 60. In particular, the analog interface circuit converts the output signals on the signal line 70 into amplified analog voltages. It should be appreciated that the magnitude of such analog voltages is indicative of the magnitude of the torque being transmitted through the socket 14 to the bolt 16 as the bolt 16 is being driven by the driver 12 into the threaded bore 18 of the work piece 20. An analog-to-digital (A/D) converter (not shown) then converts the analog voltages into a digital value for use by the microprocessor.

Figure 3:
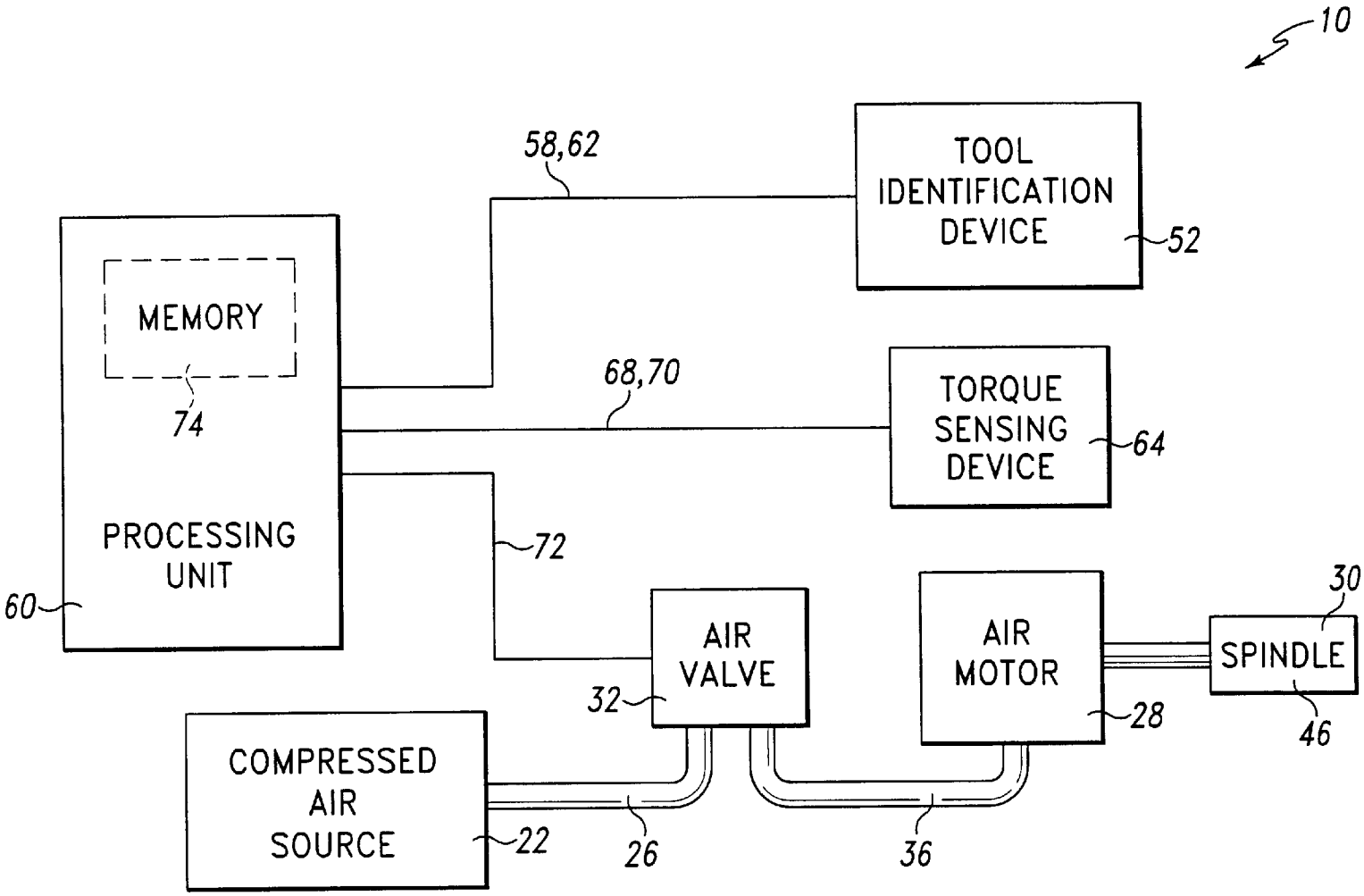
FIG. 3 is a simplified block diagram of the fastener tightening assembly of FIG. 1.

Referring now to FIG. 3, a simplified block diagram of the fastener driving assembly 10 is shown. In addition to the tool identification device 52 and the torque sensing device 64, the processing unit 60 is also electrically coupled to the air control valve 32 via a signal line 72. Presence of an output signal on the signal line 72 causes the air control valve 32 to be positioned in its closed position thereby isolating the air motor 28 from the air source 22 which in turn ceases rotation of the spindle 30 and hence the socket 14.

In a first embodiment of the present invention, the tool identification device 52 is embodied as a programmable read-only memory (PROM) device, such as an electrically programmable read-only memory (EPROM) device. The EPROM has an identification value stored therein which is used to identify the particular socket 14 in which the EPROM is embedded. In particular, the identification value is used to identify (1) the type of the particular socket 14 (i.e. the size and shape of the bolt 16 which may be tightened therewith) and (2) a torque limit value associated with operation of the particular socket 14. For example, the identification value stored in the EPROM of a first socket 14 may identify the first socket 14 as being used for driving a ⅜–16 (inch) bolt to a torque limit value of 47 Newton meters, whereas the identification value stored in the EPROM of a second socket 14 may identify the second socket 14 as being used for driving a ½–13 (inch) bolt to a torque limit value of 105 Newton meters.

In a second embodiment of the present invention, the tool identification device 52 is embodied as a resistor. Each of the resistors embedded in a respective socket 14 has a unique resistance value associated therewith. A number of identification values are included in a look up table stored in the memory device 74 of the processing unit 60. The resistance value of a given resistor may be correlated to one of the identification values included in the look up table thereby identifying the particular socket 14 in which the resistor is embedded. In particular, the processing unit 60 measures the resistance of the resistor embedded in a particular socket 14 which is secured to the driver 12. Thereafter, the processing unit 60 generates a resistance signal which instructs the memory device 74 to look up or otherwise select an identification value associated with the resistance of the resistor. As described above, the identification value may then be used to identify (1) the type of the particular socket 14 (i.e. the size and shape of the bolt 16 which may be tightened therewith) and (2) a torque limit value associated with operation of the particular socket 14. For example, the processing unit 60 may determine that the resistor embedded in a first socket has a resistance of five ohms. The processing unit 60 then queries the look up table of the memory device 74 and determines that the identification value associated with a resistance value of five ohms identifies the first socket 14 as being used for driving a ⅜–16 (inch) bolt to a torque limit value of 47 Newton meters.

Industrial Applicability

In operation, a first socket 14 may be secured to the driver 12 in order to drive a first bolt 16. It should be appreciated that the first bolt 16 is of a first type (e.g. a ⅜–16 (inch) bolt) and is to be driven to a first torque limit value (e.g. 47 Newton meters). The processing unit 60 then determines the identification value associated with the identification device 52 of the first socket 14. If the identification device 52 is embodied as an EPROM, the processing unit 60 retrieves the identification value stored in the EPROM. Thereafter, the processing unit 60 generates an identification signal in response to retrieval of the identification value which causes a torque limit value associated with the first socket 14 to be stored in the memory device 74.

Alternatively, if the identification device 52 is embodied as a resistor, the processing unit 60 measures the resistance of the resistor. Thereafter, the processing unit 60 selects the identification value associated with the measured resistance the look up table in the memory device 74. The processing unit 60 then generates an identification signal in response to selection of the identification value which causes the torque limit value associated with the first socket 14 to be stored in the memory device 74.

Once the torque limit value associated with the first socket 14 is stored in the memory device 74, the user may then begin to drive the first bolt 16 into a given threaded bore 18 of the work piece 20 by squeezing the trigger 38 of the driver 12 (see FIGS. 1 and 2). The torque sensing device 64 generates output or torque signals on the signal lines 68 (and hence 70) indicative of the magnitude of the torque being transmitted through the socket 14 to the first bolt 16 as the first bolt 16 is being driven into the threaded bore 18. The processing unit 60 monitors the signal line 70 in order to determine the value of the sensed torque. The processing unit 60 then compares the sensed torque value to the torque limit value stored in the memory device 74. If the sensed torque value equals or exceeds the stored torque limit value, the processing unit 60 generates an output signal on the signal line 72 thereby causing the air control valve 32 to be positioned in its closed position which in turn is ceases rotation of the output spindle 30 and hence the first socket 14. If the sensed torque value is less than the stored torque limit value, the user may continue to drive the first bolt 16 by continuing to squeeze the trigger 38.

If the user then desires to drive a second bolt 16, the user removes the first socket 14, and replaces it with a second socket 14. It should be appreciated that the second bolt 16 is of a second type (e.g. a ½–13 (inch) bolt) and is to be driven to a second torque limit value (e.g. 105 Newton meters). Thereafter, in a similar manner as described above in regard to the first socket 14, the processing unit 60 determines the identification value of the second socket 14 by either (1) retrieving the identification value from the EPROM embedded in the second socket 14, or alternatively (2) selecting the identification value from the look up table based on resistance of the resistor embedded in the second socket 14.

Once the identification value of the second socket 14 has been determined, the processing unit 60 generates an identification signal which causes the torque limit value associated with the second socket 14 to be stored in the memory device 74. The user may then begin to drive the second bolt 16 into the threaded bore 18 of the work piece 20 by squeezing the trigger 38. The torque sensing device 64 generates output or torque signals on the signal lines 68 (and hence 70) indicative of the magnitude of the torque being transmitted through the socket 14 to the second bolt 16 as the second bolt 16 is being driven into the threaded bore 18. The processing unit 60 monitors the signal line 70 in order to determine the value of the sensed torque. The processing unit 60 then compares the sensed torque value to the torque limit value stored in the memory device 74. If the sensed torque value equals or exceeds the stored torque limit value, the processing unit 60 generates an output signal on the signal line 72 thereby causing the air control valve 32 to be positioned in its closed position which in turn ceases rotation of the output spindle 30 and hence the second socket 14. If the sensed torque value is less than the stored torque limit value, the user may continue to drive the second bolt 16 by continuing to squeeze the trigger 38.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

Although, the fastener driving assembly 10 of the present invention has herein been described as being used for driving the bolts 16, it should be appreciated that the fastener driving assembly 10 of the present invention may be used for driving other types of threaded components. For example, the fastener driving assembly 10 may be used to drive nuts onto threaded bolts or screws into various materials. Moreover, it should be appreciated that the fastener driving assembly 10 may also be used for driving other types of components such as fittings. For example, the fastener driving assembly 10 may be used to drive zerk fittings, drain plugs, or nipple fittings used in an engine coolant system.

In addition, although the torque sensing device 64 is described as being embedded or otherwise secured to the work tool 14 and has significant benefits thereby in the present invention, the torque sensing device 64 may be disposed in other locations and still achieve many of the advantages of the present invention. For example, the torque sensing device 64 may be disposed in the driver 12 in order to measure output torque on the spindle 30.

Moreover, although the fastener driving assembly has herein been described as monitoring torque output of the driver 12, it should be appreciated that other characteristics of the mechanical output of the driver 12 may also be monitored. For example, if the driver 12 is equipped with a sensor for detecting rotational speed of the spindle 30, the identification device 52 of a given socket 14 may also have a speed limit value associated therewith thereby allowing the processing unit 60 to monitor and control rotational speed output of the driver 12.

In addition, although the driver 12 has herein been described as a pneumatic driver, it should be appreciated that other types of drivers may also be used in conjunction with the present invention. For example, the present invention may be used with a hydraulic or electric driver.

What is claimed is:

1. A method of operating a driver and an associated work tool, comprising the steps of:

securing the work tool to the driver, said work tool having an identification device attached thereto;

determining an identification value associated with the identification device and generating an identification signal in response thereto; and operating the driver so as to produce mechanical output based on the identification signal, wherein (i) said work tool includes a first electrical terminal which is electrically coupled to said identification device, (ii) said driver includes a second electrical terminal, (iii) said operating step includes the step of rotating said work tool relative to said driver, and (iv) said first electrical terminal is electrically coupled to said second electrical terminal during said rotating step.

2. The method of claim 1, further comprising the step of securing a torque sensing device to the work tool, wherein (1) the identification value includes a torque limit value, and (2) the operating step includes the steps of:

determining a torque output value of the driver with the torque sensing device, and ceasing operation of the driver when the torque output value is greater than or equal to the torque limit value.

3. The method of claim 1, wherein:

the identification device includes a semiconductor memory device having the identification value stored therein, and the determining step includes the step of retrieving the identification value from the semiconductor memory device.

4. The method of claim 3, wherein the semiconductor memory device includes a PROM.

5. The method of claim 1, wherein:

the identification device includes a resistor, and the determining step includes the step of measuring resistance of the resistor and generating a resistance signal in response thereto.

6. The method of claim 5, wherein the determining step further includes the steps of:

positioning a memory device in the driver;

storing a number of identification values in the memory device, and selecting the identification value from the number of identification values stored in the memory device based on the resistance signal.

7. A method of operating a driver and an associated number of work tools, comprising the steps of:

securing a first work tool to the driver, the first work tool having a first identification device attached thereto;

determining a first identification value associated with the first identification device and generating a first identification signal in response thereto;

rotating the work tool with the driver at a first mechanical output based on the first identification signal;

removing the first work tool from the driver and securing a second work tool to the driver, the second work tool having a second identification device attached thereto;

determining a second identification value associated with the second identification device and generating a second identification signal in response thereto; and rotating the work tool with the driver at a second mechanical output based on the second identification signal, wherein the first mechanical output is different from the second mechanical output, wherein (i) said work tool includes a first electrical terminal which is electrically coupled to said identification device, (ii) said driver includes a second electrical terminal, (iii) said first electrical terminal is electrically coupled to said second electrical terminal during said first mechanical output rotating step, and (v) said first electrical terminal is also electrically coupled to said second electrical terminal during said second mechanical output rotating step.

8. The method of claim 7, further comprising the step of securing a first torque sensing device to the first work tool, wherein (1) the first identification value includes a first torque limit value, and (2) the step of operating the driver so as to produce the first mechanical output includes the steps of:

determining a first torque output value of the driver with the first torque sensing device, and ceasing operation of the driver when the first torque output value is greater than or equal to the first torque limit value.

9. The method of claim 8, further comprising the step of securing a second torque sensing device to the second work tool, wherein (1) the second identification value includes a second torque limit value, and (2) the step of operating the driver so as to produce the second mechanical output includes the steps of:

determining a second torque output value of the driver with the second torque sensing device, and ceasing operation of the driver when the second torque output value is greater than or equal to the second torque limit value, wherein the first torque limit value is different from the second torque limit value.

10. The method of claim 7, wherein:

the first identification device includes a first semiconductor memory device having the first identification value stored therein, the step of determining the first identification value includes the step of retrieving the first identification value from the first semiconductor memory device, the second identification device includes a second semiconductor memory device having the second identification value stored therein, and the step of determining the second identification value includes the step of retrieving the second identification value from the second semiconductor memory device.

11. The method of claim 7, wherein:

the first identification device includes a first resistor, the step of determining the first identification value includes the step of measuring resistance of the first resistor and generating a first resistance signal in response thereto, the second identification device includes a second resistor, and the step of determining the second identification value includes the step of measuring resistance of the second resistor and generating a second resistance signal in response thereto.

12. The method of claim 11, further comprising the step of positioning a memory device in the driver, the memory device having a number of identification values stored therein, wherein:

the step of determining the first identification value further includes the step of selecting the first identification value from the number of identification values stored in the memory device in response to generation of the first resistance signal, and the step of determining the second identification value further includes the step of selecting the second identification value from the number of identification values stored in the memory device in response to generation of the second resistance signal.

13. A driver assembly, comprising:

a driver having a processing unit; and a work tool having an identification device secured thereto, wherein (1) said work tool is securable to said driver, and (2) said identification device is electrically coupled to said processing unit so as to enable said processing unit to determine an identification value associated with said identification device when said work tool is secured to said driver, and wherein (i) said work tool includes a first electrical terminal which is electrically coupled to said identification device, (ii) said driver includes a second electrical terminal which is electrically coupled to said processing unit, (iii) said driver is operable to rotate said work tool relative to said driver, and (iv) said first electrical terminal is electrically coupled to said second electrical terminal during rotation of said work tool relative to said driver.

14. The assembly of claim 13, further comprising a torque sensing device attached to said work tool, wherein:

said torque sensing device is electrically coupled to said processing unit when said work tool is secured to said driver, and said processing unit communicates with said torque sensing device so as to determine torque output of said driver.

15. The assembly of claim 14, wherein said torque sensing device includes a strain gage, said strain gage being electrically coupled to said processing unit when said work tool is secured to said driver.

16. The assembly of claim 13, wherein:

said identification device includes a semiconductor memory device for storing said identification value therein, and said processing unit communicates with said memory device so as to retrieve said identification value from said semiconductor memory device.

17. The assembly of claim 16, wherein said semiconductor memory device includes a PROM.

18. The assembly of claim 13, wherein:

said identification device includes a resistor, said processing unit is electrically coupled to said resistor so as to allow said processing unit to determine resistance of said resistor, said processing unit includes a memory device having a number of identification values stored therein, and said processing unit retrieves said identification value from said number of identification values in said memory device based on resistance of said resistor.

19. The assembly of claim 13, wherein:

said driver includes a spindle to which said work tool is mechanically coupled, said driver further includes a motor for rotating said spindle, said processing unit controls operation of said motor, and said processing unit adjusts mechanical output of said motor based on determination of said identification value.

20. The assembly of claim 19, wherein said motor is a pneumatic motor.

21. The method of claim 1, wherein:

said second electrical terminal is ring-shaped, and said first electrical terminal contacts said second electrical terminal during said rotating step.

22. The method of claim 1, wherein:

said first electrical terminal is spaced apart from said identification device, and said first electrical terminal is electrically coupled to said identification device via a signal line.

23. The method of claim 7, wherein:

said second electrical terminal is ring-shaped, and said first electrical terminal contacts said second electrical terminal during both said first mechanical output rotating step and said second mechanical output rotating step.

24. The assembly of claim 13, wherein:

said second electrical terminal is ring-shaped, and said first electrical terminal contacts said second electrical terminal during rotation of said work tool relative to said driver.

25. The assembly of claim 13, wherein said first electrical terminal is spaced apart from said identification device, further comprising:

a signal line which electrically couples said first electrical terminal to said identification device.

* * * * *